United States Patent [19]

Lowther

[11] Patent Number: 4,503,013
[45] Date of Patent: Mar. 5, 1985

[54] ULTRA-HIGH POWER EXPLODING WIRE SYSTEMS

[75] Inventor: Frank E. Lowther, Chatsworth, Calif.

[73] Assignee: Atlantic Richfield Company, Los Angeles, Calif.

[21] Appl. No.: 484,060

[22] Filed: Apr. 11, 1983

[51] Int. Cl.³ .................. B01J 19/08; B01J 19/10
[52] U.S. Cl. ................... 422/127; 422/186; 422/186.04
[58] Field of Search ............ 422/127, 240, 241, 165, 422/166, 199, 186.04, 186; 75/0.5 L; 118/723, 725, 726, 729

[56] References Cited

U.S. PATENT DOCUMENTS 3,068,337 12/1962 Kuebrich et al. .............. 118/726 X
3,634,040 1/1972 Johnson et al. ..................... 422/127
3,970,820 7/1976 Mahl .............................. 118/726 X

OTHER PUBLICATIONS

Coffman, Moody L., "The First Picosecond in an Exploding Wire", Proceedings of the Fourth Conference on the Exploding Wire Phenomenon, Boston, Oct., 1967.

Siegel, Bernard and Richard L. Johnson, "A Thermal Model of Wire Explosions in Methane", Proceedings of the Fourth Conference on the Exploding Wire Phenomenon, Boston, Oct., 1967.

Primary Examiner—Barry S. Richman
Assistant Examiner—Brion P. Heaney
Attorney, Agent, or Firm—Drude Faulconer

[57] ABSTRACT

An ultra-high power exploding wire system for enhancing a chemical and/or physical reaction including embodiments that are capable of multiple firing. An element containing a plurality of members constructed of explodible material, e.g. metal or semi-conductor material, is movably mounted in the housing of a chemical/physical reactor. A firing means is provided in the housing which will explode the members when the element is moved into contact therewith. A pulse power supply is electrically connected to the element and to the firing means to provide electrical power for exploding the members.

7 Claims, 5 Drawing Figures

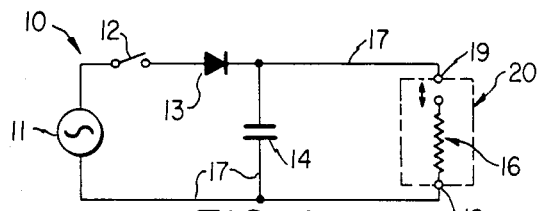
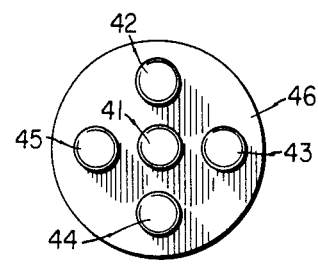
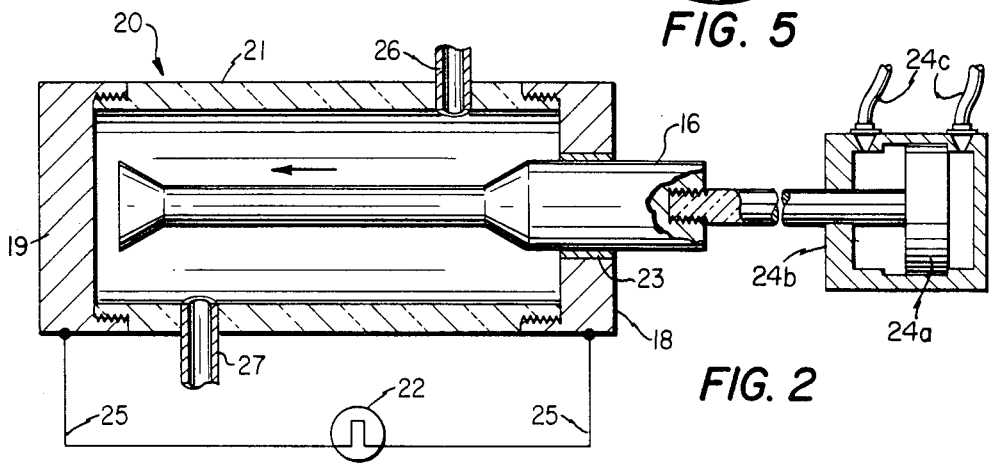
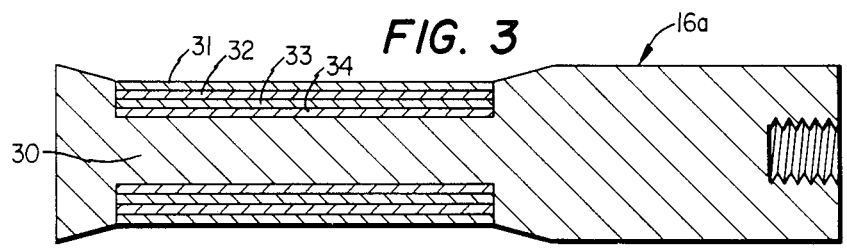
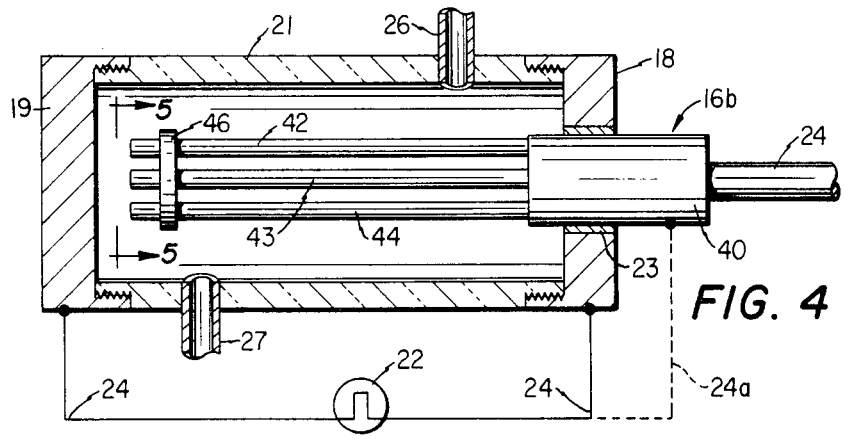

ULTRA-HIGH POWER EXPLODING WIRE SYSTEMS

BACKGROUND OF THE INVENTION

This invention relates to exploding wires and more particularly relates to chemical reaction chambers having ultra-high power exploding wire systems for use in enhancing chemical and/or physical reactions.

Investigations have been made into the use of exploding wires or exploding bridge wires, as they are sometimes called, to enhance certain chemical reactions, see "A Thermal Model of Wire Explosions in Methane", B. Siegel and R. L. Johnson, Proceeding of the Fourth Conference on the Exploding Wire Phenomenon, held at Boston, Mass., Oct. 18-20, 1967.

The results of these investigations are encouraging in that exploding wires possess some truly unique features, such as: the capability of (a) injecting energies in the 10 kilocalories and greater per mole range in sub-microsecond time intervals; (b) providing electrical to chemical conversion efficiencies much superior to those provided by other electrical sources, e.g. corona; and (c) producing energy which, in turn, imparts high velocity to the physical mass of those reactants in contact with the exploding wire.

As can be seen from the above, exploding wires (e.g. wires, foils, or layers of metals or semiconductor materials) provide a way of concentrating large amounts of energy into a small space. Reaction times may be as short as a fraction of a microsecond, making the available peak power as well as the average power extremely large. For example, a two farad capacitor charged to 10,000 volts will store $10^8$ joules of energy which is approximately the same potential energy in one gallon of gasoline. However, the gallon of gasoline requires 10,000 gallons of air and a relatively long period of time to release its total energy. The same energy stored on the capacitor may be dissipated in a millisecond by dumping the charge into a resistive load. If this resistive load is a metallic or semiconductive material, then it becomes an exploding wire system.

To understand the basic premise involved in an exploding wire system, one only has to consider the common electrical fuse. During normal operations, the current flowing through the fuse is not sufficient to cause a significant voltage drop across the fuse and the fuse therefore has no significant influence upon the overall electrical circuit. However, when the current through the fuse is increased to some value determined by the fuse characteristics, the voltage drop across the fuse becomes sufficient to melt the current conducting element (e.g. wire) in the fuse. This melting process opens up the electrical circuit and current can no longer flow until the fuse is replaced.

The exploding wire concept represents an extreme case of such an electrical fuse. Typically, a bank of electrical capacitors are charged to a high energy and voltage level. The charged bank is discharged, via an appropriate switch, through a series circuit that contains the element, i.e. wire, to be exploded. The current through the exploding wire is many orders of magnitude greater than that necessary to fuse the wire. The extreme resistive heating in the exploding wire causes a near instantaneous vaporization of the wire, itself. An energy balance reveals that the electrical energy stored on the capacitor is converted to useful energy in a variety of ways: (1) the wire is vaporized which requires energy to heat up the wire to its boiling temperature and to provide the latent heats of fusion and vaporization; (2) the wire atoms are given a considerable velocity (kinetic energy) due to the explosion; (3) a shock wave is produced in the surrounding atmosphere of the wire; (4) electromagnetic radiation is given off; e.g. optical, x-ray, infrared, ultraviolet, etc.; and (5) molecular bonds may be broken in the atmosphere around the wire. For a further discussion of exploding wire systems, see co-pending application U.S. Ser. No. 454,506, filed Dec. 29, 1982, and incorporated herein by reference.

As mentioned above, exploding wires of the type discussed have been used experimentally to enhance certain chemical and/or physical reactions. The fast inherent speed at which energy can be imparted to these reactions by an exploding wire system is attractive since such reactions, themselves, are extremely fast but are normally limited by how rapidly such energy can be added. However, as far as it is known, exploding wires of this type have not been used for enhancing such reactive processes on a commercial scale. This is believed to be due in part to the fact that (1) a practical method for fast, repeatable firing of an exploding wire have heretofore been lacking; and (2) the total energy levels have been much too low for these operations.

SUMMARY OF THE INVENTION

The present invention provides an ultra-high power exploding wire system for enhancing a chemical and/or physical reaction including embodiments which are capable of being fired several times without requiring the replacement of the explodible element. In accordance with the present invention, an explodible element is movably mounted in a housing of a chemical and/or physical reactor. A means is provided in the housing for firing the explodible element when said element is moved into contact therewith. A pulse power supply is electrically connected to the element and to the firing means for supplying the electrical power for exploding the element.

More specifically, in a first embodiment of the present invention, the ultra-high power exploding wire system comprises a cylindrical housing made of an electrically insulative material, e.g. glass, ceramic, or the like, closed at both ends by electrically conductive caps. An element of an explodible material, e.g. metal or semi-conductor material, is slidably mounted through and is in good electrical contact with one of said end caps. A pulse power supply is electrically connected to the end caps to supply the power necessary to explode the explodible element. The housing has an inlet and an outlet therein by which chemical reactants can enter and exit the housing. A means is provided to move the explodible element into contact with the other of said end caps which serves as a firing means to complete a firing circuit which explodes the element. The firing of the element enhances the reaction between reactants in the housing as will be explained more fully below.

In a second embodiment of the present invention, a multiple-firing explodible element is provided which comprises a body having a plurality of concentric layers of explodible material thereon. When the element is moved into contact with the other of the end caps to complete the firing circuit, the outermost layer will explode. The element is then retracted, the system is recharged, and the element is again moved into contact with the other end cap to fire the second layer, and so on.

In a third embodiment, a plurality of explodible members are carried by the body of the element and are exploded when the members are moved into contact with the other end cap.

BRIEF DESCRIPTION OF THE DRAWINGS

The actual construction, operation, and the apparent advantages of the invention will be better understood by referring to the drawings in which like numerals refer to like parts and in which:

FIG. 1 is a schematic diagram of an exploding wire power circuit;

FIG. 2 is a sectional view of an ultra-high power exploding wire system in accordance with the present invention;

FIG. 3 is a sectional view of another embodiment of an explodible element of the present invention;

FIG. 4 is a sectional view of still another embodiment of the present invention; and FIG. 5 is a view taken along line 5—5 of FIG. 4.

DESCRIPTION OF THE PREFERRED EMBODIMENTS

Referring more particularly to the drawings, FIG. 1 discloses a simplified schematic of a typical circuit 10 for supplying electric energy to the exploding wire system of the present invention. Power is supplied by a high-voltage, alternating current source 11 which may be any of several, commercially-available power supplies which are capable of providing pulsed electrical energy in a programmable or selectable sequence, e.g. Model 606, High Power Pulse Generator, Cober Electronics, Stanford, Conn. Source 11 supplies power through switch 12 and diode 13 to capacitor bank 14 which, in turn, is connected to end caps 18, 19 of a reactant vessel 20. A movable, explodible element 16 has one end in electrical contact with end cap 18 and its other end normally spaced from end cap 19 which, in turn, forms the means for firing explodible element 16. All connecting leads 17 in circuit 10 are of adequate gauge copper or the like to insure that substantially all of the energy is transferred to element 16 upon firing.

The operation of circuit 10 for each firing cycle is as follows. Switch 12 is closed for a timed interval sufficient to fully charge capacitor bank 14 to its desired voltage. Explodible element 16 is then moved into contact with end cap 19 to complete the firing circuit and discharge the energy stored in capacitor bank 14 into explodible element 16 thereby exploding same. Explodible element 16 is replaced (if required) and the procedure is repeated or, in the case of a multiple-firing element 16, the element is retracted out of contact with end cap 19, the capacitor bank 14 is recharged, and then the procedure is repeated.

In accordance with the present invention, FIG. 2 illustrates a first embodiment of an ultra-high power exploding wire system which is to be used to enhance a chemical and/or physical reaction. As illustrated, this system is comprised of a reactor 20 having a cylindrical housing 21 which is constructed of an electric insulating material, e.g. glass, ceramic, or the like. Pulse power supply 22 having circuits, capacitors, switches, etc. similar to those of FIG. 1 is attached to both electrically conductive caps 18, 19 which, in turn, are threaded or otherwise attached to either end of housing 21 to close same.

Explodible element 16 is slidably mounted through and in good electrical contact with an electrically-conducting bushing 23 which, in turn, is mounted in end plate 18. Element 16 is comprised of an electrically-conductive, explodible material which may be of metal, e.g. copper, aluminum, platinum, gold, silver, lead, halnium, or similar metallic material; alloys of such metals, or may be a semi-conductor material, e.g. germanium, silicon, carbon, or the like. For example, element 16 may consist of solid copper weighing a pound or more. Element 16 is moved into and out of contact with end cap 19 by any suitable means, e.g. by means of rod 24 attached thereto and which, in turn, is actuated by any of several known means, e.g. a piston 24a affixed to rod 24 and movable within cylinder 24b when actuated by fluid (e.g. hydraulic fluid or air) furnished to cylinder 24b through lines 24c. Other means, e.g. solenoids, rotating screw, etc., can also be used to actuate rod 24. Rod 24 is preferably comprised of an electrically-insulative material.

To carry out an operation with system 20, element 16 is spaced from the firing means, i.e. end cap 19 at a sufficient distance so that there will be no arcing or premature discharge between element 16 and end cap 19 when the system is charged. Electrical energy is available from power supply 22 to conductive end caps 18, 19 at voltage and energy levels sufficient to substantially instantaneously explode element 16 or at least a portion thereof whenever system 20 is fired. Rod 24 is actuated to move element 16 into contact with end cap 19 which completes the firing circuit whereupon all of the available electrical energy is immediately dumped into element 16 causing element 16 to explode. Reactant fluids or the like are admitted into housing through inlet 26 and the resulting products are drawn off through outlet 27.

In reactor 20 of FIG. 2, the degree of useful energy available will depend upon the excess energy supplied to element 16. For example, if only enough energy is supplied to vaporize element 16, then there will be little, if any, energy left over for useful work. If, however, considerable excess energy is supplied, then kinetic energy of the flying debris particles will be available to break chemical bonds of the reactant fluids upon collision. Depending upon the excess energy, optical energy, heat, shock waves, x-rays, etc., may also be generated which are useful to further enhance the reaction. The energy aspects will become more clear in the examples which follow later.

In the operation of the exploding wire system in FIG. 2, hot, flying debris particles and related products collide with fluid atoms and molecules of the reactant within the housing 21, thereby causing chemical and/or physical reactions to occur. In some instances, explodible element 16 may be operated to fire several times. In such instances, the energy supplied on the first firing is sufficient only to explode a portion of the outer skin of element 16. After the first firing, element 16 is retracted out of contact with end cap 19 and the system is recharged. Element 16 is then moved back into contact with end cap 19 to effect a second firing to explode the next layer of skin. This procedure may be repeated until element 16 is exhausted. This procedure is possible due to the well-known skin effect. The sharp wavefront of the applied electrical energy pulse if in effect a high frequency pulse and conduction is therefore concentrated near the surface (skin) of element 16.

FIG. 3 illustrates another ultra-high power explodible element 16a capable of multiple firing. Element 16a is comprised of elongated body 30 having a plurality of concentric layers 31, 32, 33, 34 (four shown) of explodible materials mounted along at least a portion of the length of body 30. Each layer may be formed of the same material or each may be formed of a different material. For example, layer 31 may be copper, layer 32 may be silver, layer 33 may be copper, etc. The sequential power pulses to be applied to element 16a are adjusted or programmed to explode the different layers as element 16a is moved into contact with end cap 19 as described above. The first firing will explode and thereby ablate layer 31, the second firing will explode and ablate layer 32, and so on. The total number of layers possible will be determined by practical matters of size and shape.

Still another embodiment of the present invention is disclosed in FIG. 4. Reactor housing 21, end caps 18, 19, bushing 23, and power supply 22 are the same as those disclosed in FIG. 2. Explodible element 16b is slidably mounted in bushing 23 similarly as before. Element 16b is comprised of a body 40 having a plurality of explodible members (e.g. rods 41, 42, 43 44, 45) extending therefrom. The explodible members pass through support ring 46 which support the outer ends of the explodible members in a spaced relationship.

The operation of the embodiment in FIG. 4 is basically the same as described above. A charge of energy from source 22 is supplied through caps 18, 19 and is discharged into element 16b to explode the members when the outer ends of the members are moved into contact with end cap 19. It should be recognized that, if desirable, the charge can be applied directly to the body of the explodible element (see dotted line 24a in FIG. 4) and will have the same results as if it were applied to end cap 18.

The energy per pulse, pulse firing rate, element composition, reactant flow rates, stoichiometry of reactants, etc., will be adjusted to optimize the particular process of interest. This will become clearer when the examples are discussed below. The ultra-high power exploding wire system of the present invention is capable of performing useful functions is enhancing chemical and/or physical reactions in several different operational modes such as:

Mode 1. The hot, fast metallic atoms from the exploding element simply transfer kinetic energy to the fluid molecules surrounding the element. The net result is a convenient way to heat the reactants faster than is possible by other means.

Mode 2. The hot, fast metallic atoms from the exploding element simply transfer enough kinetic energy to "activate" a given chemical or physical reaction. The exploding film supplies a "spark plug" action, so to speak.

Mode 3. The debris atoms from the exploding element may be by design, part of the reaction. Consider, for example, a carbon (graphite) element and a hydrogen atmosphere, the reactor may be used to form hydrocarbon fuels, directly from carbon and hydrogen using only electricity.

Mode 4. The debris atoms merely provide a convenient method of exposing a large catalytic area. For example, it is known that surface absorption is a part of all known catalytic actions. A one centimeter (cm) cube of platinum normally exposes only 6 cm of surface area. If exploded, however, the exposed surface area is increased by 10's of orders of magnitudes. This high area catalysis effect is obviously very useful during the exposure time of the catalyst in the surrounding reactants.

While special cases may require other reactor shapes, cylindrical reactors have been illustrated since these are the cheapest to manufacture and easiest to use.

Various element materials take different amounts of energy to vaporize. The vaporization energy per mole converted to a per gram basis depends upon the molecular weight of the material used. In some cases, the number of moles vaporized is critical and in others it is the number of grams that is important. Chart I below summarizes the vaporization energy for typical element materials and is useful in illustrating certain examples of the present invention. In general, the amount of energy required to heat up and fuse the element is much less than the heat of vaporization. Therefore, these lesser energy requirements are not included in Chart I. Energy requirements are also expressed in the familiar KWH/pound units. Thus, 0.61 KWH/pound for copper simply means that 0.61 KWH (kilowatt-hours) of electrical energy is required to vaporize one pound of copper. Water is included in Chart I for reference purposes.

CHART I

| Material | Molecular Weight | KCal/mole | KCal/gram | KWH/pound |
|---|---|---|---|---|
| Copper | 63.5 | 72.8 | 1.15 | 0.61 |
| Graphite | 12 | 170 | 14.2 | 7.48 |
| Aluminum | 27 | 78.7 | 2.91 | 1.53 |
| Iron | 55.8 | 83.9 | 1.50 | 0.79 |
| Silicon | 28.1 | 71.0 | 2.53 | 1.33 |
| Germanium | 72.6 | 79.9 | 1.10 | 0.58 |
| Silver | 107.9 | 60.7 | 0.56 | 0.30 |
| Gold | 196.9 | 77.5 | 0.39 | 0.21 |
| Platinum | 195 | 122 | 0.63 | 0.33 |
| Lead | 207 | 42.9 | 0.21 | 0.11 |
| Zinc | 65.4 | 27.5 | 0.42 | 0.22 |
| Tin | 118.7 | 69.4 | 0.58 | 0.31 |
| Nickel | 58.7 | 88.9 | 1.51 | 0.80 |
| Hafnium | 178.5 | 158.0 | 0.89 | 0.47 |
| Water | 18 | 9.54 | 0.53 | 0.28 |

Certain other relationships will be useful in describing the examples to follow. The energy stored in an electrical capacitor is given by:

$$E = \tfrac{1}{2}CV^2 \quad (1)$$

where:
E = Stored energy (watt-seconds)
C = Capacitance (Farads)
V = Potential (Volts)
$E \times 2.4 \times 10^{-4} = KCal$.

The characteristic time (time constant) required to transfer the stored energy from the capacitor to a resistor load is:

$$T = RC \quad (2)$$

where:
T = Time constant (seconds)
R = Load resistance (ohms)
C = Capacitance (Farad).

The resistance of the load (films, wires, etc.) is:

$$R = rL/A \quad (3)$$

where:
R=Resistance (ohm)
r=Resistivity characteristic of the particular material (ohm-cm.)
L=Length of material (cm.)
A=Cross sectional area of material (cm²)

EXAMPLE 1

A reactor similar to FIG. 2 is constructed wherein the overall length is 200 cm. and the outside diameter is 10 cm. Explodible element 16 is comprised of one pound of copper which is to be vaporized with about 100% excess energy supplied to the resulting debris.

$$\text{Heat of vaporization for copper} = 0.61 \text{ KWH/lb.} \quad (4)$$
$$\text{Applied energy} = 2 (0.61) = 1.22 \text{ KWH}$$
$$= 4.4 \times 10^6 \text{ joules}$$

The energy to be supplied by a capacitor charged to 20,000 volts is:

$$\tfrac{1}{2}C (20,000)^2 = 4.4 \times 10^6 \text{ joules} \quad (5)$$

C=0.022 farads

The geometry of copper element 16 is designed to present an electrical resistance R of 1.0 milliohm or $10^{-3}$ ohm. For copper, the known characteristics: (1) resistivity r is equal to $1.7 \times 10^{-6}$ ohm-cm.; and (2) density is equal to 8.9 gr./cm³. Therefore, in this example the following equations can be written:

$$\text{Volume} = AL = \frac{\text{Weight}}{\text{density}} = \frac{454 \text{ gr.}}{8.9 \text{ gr./cm}^3} = 51.01 \text{ cm.}^3 \quad (6)$$

Substituting into equation (3):

$$10^{-3} \text{ ohm} = 1.7 \times 10^{-6} \text{ ohm-cm. } (L/A) \text{ or} \quad (7)$$
$$L/A = 588.0 \text{ cm}^{-1}$$

By combining equations (6) and (7), the length L of element 16 is found to be 173 cm. and the diameter to be 0.61 cm.

From equation (2), the time characteristic of the explosion is:

$$T = 10^{-3} \text{ ohm } (0.022 \text{ farad}) = 22 \text{ microseconds}$$

The reactor is charged with methane gas and element 16 is fired by moving it into contact with end cap 19. The resultant products are found to be rich in acetylene and hydrogen gas in accordance with the following reaction.

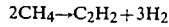

EXAMPLE 2

The reactor of Example 1 is charged with nitrogen and hydrogen at standard conditions and element 16 is exploded. The resultant products are found to be rich in ammonia in accordance with the following formula:

$$N_2 + 3H_2 \rightarrow 2NH_3$$

What is claimed is:
1. An ultra-high power, exploding wire system for enhancing chemical and/or physical reactions comprising:
   a reactor comprising a housing having an inlet and an outlet, said housing being constructed of an electrically insulative material;
   an end cap constructed of an electrically conductive material affixed to each end of said housing to close said housing;
   an explodible element slidably mounted through one of said end caps and being movable into and out of contact with the other of said end caps; said explodible element comprising:
   a body; and
   a plurality of separate explodible members carried by said body;
   means electrically connected to said body of said explodible element and to the other of said end caps to supply electrical power thereto; and
   means to move said explodible element into and out of contact with said other of said end caps whereby at least one of said explodible members will be exploded each time said explodible element contacts said other of said end cap.
2. The ultra-high power, exploding wire system of claim 1 wherein said body is cylindrical in shape having a reduced diameter along a portion of its length and wherein said plurality of explodible members comprises:
   a plurality of concentric layers mounted on said reduced portion of said body; each of said layers being comprised of an explodible material.
3. The ultra-high power, exploding wire system of claim 2 wherein said explodible material is comprised of a metal selected from the following group: copper, aluminum, platinum, gold, silver, lead, hafnium, or alloys thereof.
4. The ultra-high power, exploding wire system of claim 2 wherein said explodible material is comprised of a semi-conductor material selected from the following group: germanium, silicon, or carbon.
5. The ultra-high power, exploding wire system of claim 1 wherein said plurality of explodible members comprises:
   a plurality of rods affixed to and extending parallel from said body, each of said rods being comprised of an explodible material.
6. The ultra-high power, exploding wire system of claim 5 wherein said explodible element is comprised of a metal selected from the following group: copper aluminum, platinum, gold, silver, lead, hafnium, or alloys thereof.
7. The ultra-high power, exploding wire system of claim 5 wherein said explodible element is comprised of a semi-conductor material selected from the following group: germanium, silicon, or carbon.

* * * * *